United States Patent [19]
Rodgers

[11] Patent Number: 5,974,762
[45] Date of Patent: Nov. 2, 1999

[54] COMPOSITE CONCRETE

[76] Inventor: Michael S. Rodgers, 3418 57th St., Lubbock, Tex. 79413

[21] Appl. No.: 09/058,598

[22] Filed: Apr. 10, 1998

Related U.S. Application Data

[63] Continuation-in-part of application No. 08/711,414, Sep. 5, 1996, Pat. No. 5,737,896.
[60] Provisional application No. 60/050,630, Jun. 20, 1997.

[51] Int. Cl.$^6$ .................... E04C 2/06; E04H 9/14
[52] U.S. Cl. .............. 52/742.14; 52/309.9; 52/309.12; 52/309.17; 52/797.1; 52/800.12; 52/745.19
[58] Field of Search ............. 52/309.9, 309.12, 52/309.17, 797.1, 800.12, 742.14, DIG. 7, 745.19; 109/58, 80

[56] References Cited

U.S. PATENT DOCUMENTS

| | | | |
|---|---|---|---|
| 2,381,779 | 8/1945 | Scott ........................................ | 109/80 |
| 3,359,022 | 12/1967 | Russell ............................. | 52/800.12 X |
| 3,654,018 | 4/1972 | Bogue et al. .................. | 52/DIG. 7 X |
| 3,984,266 | 10/1976 | Christensen et al. ........... | 52/DIG. 7 X |
| 5,055,252 | 10/1991 | Zimmerman .................... | 52/742.14 X |
| 5,447,593 | 9/1995 | Tanaka et al. ................. | 52/DIG. 7 X |
| 5,649,398 | 7/1997 | Isley, Jr. et al. ................. | 52/DIG. 7 X |
| 5,737,896 | 4/1998 | Rodgers ................................ | 52/745.2 |

*Primary Examiner*—Christopher T. Kent
*Attorney, Agent, or Firm*—Royston, Rayzor, Vickery, Novak & Druce, L.L.P.

[57] ABSTRACT

A method of manufacturing a projectile resistant concrete panel used in the construction of buildings including making a concrete panel and applying a composite laminate thereto. The method includes coupling together a plurality of frame segments so that a concrete frame is established. The frame has an interior space that forms a receiver for a concrete mixture. The frame is filled with the mixture so that the interior space is spanned by the mixture across the frame. The concrete mixture is cured to a rigid state so that the set concrete mixture is retained within the frame thereby forming a concrete panel. The concrete mixture may be a lightweight mixture having polystyrene pellets therein which improve upon the insulating characteristics of the panel. Building construction panels manufactured from the concrete mixture may be combined with high strength laminate coatings or layers. In this layered embodiment, the combination panel embodies sufficient strength characteristics to resist high wind storm conditions including strike tests of airborne objects. In another embodiment the lightweight concrete is utilized in a building block utilizable as a substitute for conventionally manufactured cinder blocks.

19 Claims, 4 Drawing Sheets

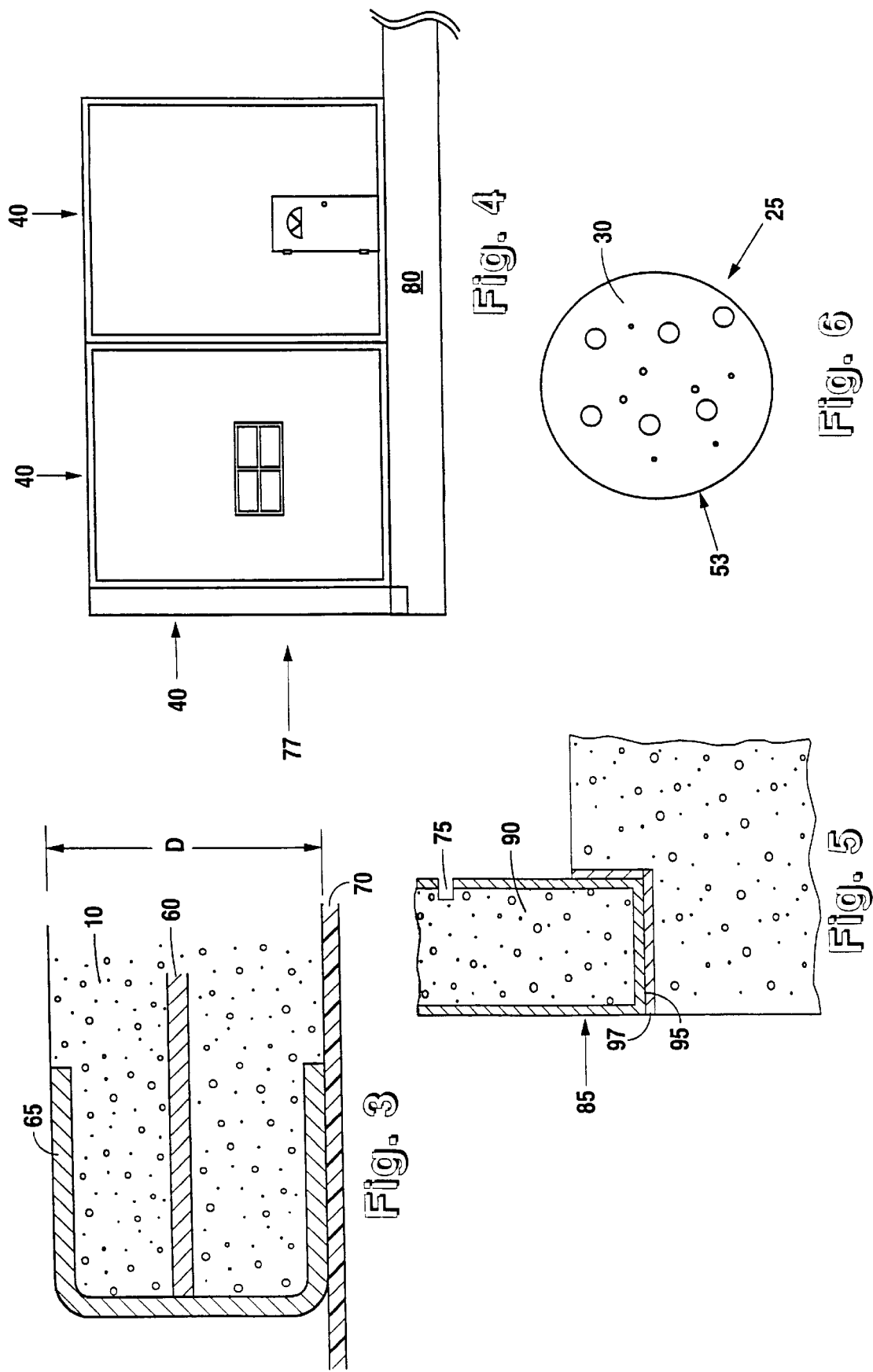

COMPOSITE CONCRETE

RELATED PATENT APPLICATIONS

This patent application claims priority to U.S. Pat. No. 5,737,896 filed Sep. 5, 1996 entitled Lightweight Concrete and to U.S. Provisional Application No. 60/050,630 filed Jun. 20, 1997 and entitled Composite Reinforced Concrete Panels. By this reference, the full disclosures, including the drawings, of U.S. patent application Ser. No. 08/711,414, U.S. Provisional Application No. 60/050,630 and PCT International Patent Application Serial No. PCTIUS97/15659 are incorporated herein.

DESCRIPTION

1. Technical Field

This invention relates generally to lightweight concrete used in the construction of buildings and other structures. More particularly, it relates to lightweight concrete within which a lightweight aggregate has been incorporated. Examples of such aggregates include polystyrene pellets, fiberglass modules and/or organic matter such as cotton boll fragments produced as a byproduct of cotton ginning, ground wood and saw dust. Furthermore, the invention relates to reinforcement coatings or laminate layers that are applied either to the exterior surface or across the interior surface of a concrete panel used as a building construction component. Still further, this invention relates to substitute building blocks for use in place of cinder blocks that are constructed from the lightweight concrete and can therefore have greater length dimensions and still be manually installed.

2. Background Art

Various compositions of concrete have long been used in the construction industry for building assorted structures. Concrete is a major component in many load bearing supports maintained under compression. Examples of such supports include pilings upon which buildings are supported, and foundations and slabs that serve as bases for buildings. In other areas, concrete is used for sealing and providing structural integrity. An example of such use is the casing of water and oil wells.

The primary components of concrete are cement and aggregates that are fluidized with water and subsequently set into a rigid state. A primary drawback associated with the use of conventional concrete mixtures is that the resulting product is heavy and not suited for use in many applications because of its excessive weight. Many of the qualities of concrete, however, are highly advantageous and would be suitable in many construction environments but for its relatively high weight. Examples of such qualities are concrete's fire retardation, hardness and rigidity.

Previous attempts have been made to reduce the weight of concrete and achieve other beneficial characteristics. One such example is found in U.S. Pat. No. 5,352,390 issued to Hilton et al. on Oct. 4, 1994 for Cementitious Compositions Containing Shredded Polystyrene Aggregate. The disclosure of that patent describes a fire-proofing composition wherein a cementitious binder is utilized with a polystyrene aggregate. The concrete composition of Hilton may optionally include an air entraining agent and other fibrous materials. This cementitious composition, however, is pump-sprayed upon typically metal building components. The compound's primary purpose is to lend fire-proofing qualities to the building within which it is utilized.

In the Hilton disclosure It is explained that polystyrene panels are to be appropriately shredded, with the resulting shredded matter being used as aggregate in the concrete. The individual polystyrene particles of this shredded aggregate are "opened" to such a degree that the fluidized cement mixture is able to invade the cellular body or interior of the particle thereby weighing it down and facilitating its mixture into the cement binder. The Hilton disclosure is specific about the process for shredding the polystyrene into particles and its description of the resulting polystyrene aggregate; that aggregate having irregularly shaped exterior surfaces with tears and ragged edges. The shredding process opens a substantial number of the cells on the surface of the polystyrene so that the cementitious binder is allowed to penetrate the cellular structure thereby providing a more integral mix between the binder and the particle. It is further explained that if a sufficient number of cells are penetrated by the slurry, the buoyancy of the particles is decreased to a point that the thickness of the slurry prevents the particles from floating therein. A certain degree of fluidity and homogeneity is required to maintain the pumpability of the Hilton composition. In strict contrast, however, it is explained that non-shredded beads segregate within the slurry, with the resulting localized concentrations of beads potentially clogging the pump, feed lines and spray nozzles of the applicator.

By opening the cells of the polystyrene particles as described in the Hilton patent, the individual polystyrene particles become necessarily weighted so that they mix into the pumpable slurry. This invasion of the fluid slurry into the particle, however, reduces its insulative qualities. Still further, it causes the resulting concrete to have significantly higher densities thereby increasing the weight of a given volume of concrete than if the cells of the polystyrene remained closed. Because of the limited application for the intention of the Hilton patent, that is, spraying the composition upon metal structural components in relatively thin layers, the increased weight and density does not appear to cause ill-effects. When used in other applications, however, it has been found that such increases in density and weight prevent the realization of the true potential for using polystyrene aggregate.

Conventional concrete panels that have been used in building construction are known to resist compressive forces well, but not necessarily forces that place the concrete portions of a panel in tension. Because concrete often fails under tensile stresses, concrete panel building construction does not necessarily favorably withstand forces applied thereupon and perpendicular to the plane of the panel. For this reason, panels of conventional construction will not withstand substantial side forces, particularly impact forces. Such lateral forces are often experienced in several storm conditions such as during a tornado or hurricane. Without substantial reinforcement, generally in the form of steel rebar or the like, concrete panel construction will not necessarily be certifiable for use in storm prone locales. Accordingly, it is desirable to have the capability to provide concrete panels for building construction that not only are suitable for supporting compressive forces, but that will also resist tensile stresses and sideward impacts that otherwise compromise the integrity of the building component.

The use of cinder blocks constructed from conventional concrete are well known in the building industry. Their use, however, had been substantially limited because there are few options for finishing a building constructed therefrom both interiorly and exteriorly of a cinder block wall. Particularly, the hard face of the wall prevents the fastening of conventional finishing products such as exterior brick fascia and interior finishes such as dry wall or sheet rock. The primary reason is that neither nails nor screws can be inserted into the hard surfaced walls. Still further, like conventional brick erection, cinder block construction is limited in height by the weight of the vertical row stacks since mortar is used between the layers of blocks and the increasing weight of a growing wall squeezes mortar from underlying layers. As a result, a cinder block wall must be built in stages, often requiring idle time for those installing the wall and increasing both the time for construction and the costs associated therewith.

DISCLOSURE OF THE INVENTION

This invention includes features and components that have been invented and selected for their combined benefits and superior performance as lightweight concrete and concrete panels for use in building construction. Each of the individual components works in association with the others and are optimally mated for superior performance.

Referring now to specific embodiments of the lightweight concrete and several of its applications in the building construction business, additional benefits and advantageous features will be appreciated. One embodiment of the present invention is a method for preparing a lightweight concrete. It includes mixing a slurry comprising water, a cementing binder and a fine grain aggregate together. Polystyrene pellets are add-mixed to the slurry to form a substantially homogeneous lightweight concrete mixture.

In another embodiment, the lightweight concrete may be placed about conduits or pipes. The pipes may be located either above or below ground, but the use of the lightweight concrete as an encasement for piping has been found to be of particular benefit in below ground settings. The insulating lightweight concrete can be poured directly around the pipes and allowed to set thereabout. Alternatively, blocks or shells of the concrete can be formed having recesses that accommodate and receive one or more pipe lengths when installed thereupon. Complimentary halves may be mated together to form a complete enclosure about a conduit. This application of the lightweight concrete finds utility where cooled and heated fluids are conveyed underground, especially for heating and air conditioning purposes.

In yet another embodiment, the lightweight concrete is used in the manufacture of cinder block-type building units. As a result of using the lightweight concrete, larger building units can be constructed than the conventional sixteen inch long cinder blocks of conventional design. The lighter weight permits the same handlers to manually lift and position the block units in the construction process. Similar to cinder blocks, these improved building block units also have cylindrically shaped voids that are vertically oriented and aligned one above the other in a wall's construction. By this alignment, continuous columns are established from the bottom to the top of such a constructed wall. These columns may then be optionally reinforced by such means as similarly vertically oriented rebar and then filled with either lightweight concrete or conventional weight concrete. In so doing, a concrete column is established that extends vertically and continuously through the constructed wall and permits that wall to be load bearing.

Because of the lightweight concrete's ability to be screwed and nailed into, the surface of walls constructed from such building block units facilitate the fastening of desired fascia thereto both interiorly and exteriorly. In an enhanced embodiment of such a block built wall, expanded metal sheeting is provided at either the interior or the exterior surface as reinforcement for restraining forces that apply tensile stresses to the block built wall. A specific utilization has been found in storm prone areas where the expanded metal sheeting acts as a shield to flying objects passing through the wall.

In the construction of a wall using these lightweight building block units, glue is substituted for the mortar that is used in conventional cinder block construction. A thin layer of glue is used both between the wall and an underlying slab and elevated layers of blocks in the progressively increasing layers of blocks as the wall is constructed. By eliminating the need for a layer of mortar between the rows of blocks, there is no longer a concern about the weight of blocks above wet mortar squeezing it from between the layers. This enhancement permits an entire wall to be built without delay in that it can be continuously stacked using the thin layers of glue instead of the thicker and squeezable mortar layers.

Another embodiment of the present invention is a method for making a lightweight concrete panel for use in a building's construction. The method includes coupling together a plurality of frame segments so that a frame for the concrete panel is established. The frame has an interior space that forms a receiver for a lightweight concrete mixture. The frame is filled with a lightweight concrete mixture so that the interior space is spanned by the lightweight concrete mixture across the frame. The lightweight concrete mixture is cured to a rigid state so that the set lightweight concrete mixture is retained within the frame thereby forming a lightweight concrete panel.

In yet another embodiment, this invention provides a method for constructing a building using lightweight concrete panels. A plurality of lightweight concrete panels are formed, each bounded at least partially about a perimeter by a concrete frame. A building foundation is provided with a recess formed about a perimeter thereof, the recess having a width approximately equal to a thickness of the lightweight concrete panels. At least a portion of the plurality of lightweight concrete panels are up-ended into the recess and adjacent lightweight concrete panels are coupled together so that a substantially upright wall of a building is formed about at least a portion of a perimeter of the foundation.

In still another embodiment, this invention includes the manufacture of concrete panels made from lightweight concrete, regular concrete and/or high density concrete and used in the construction of buildings designed to withstand storm conditions that may be experienced in tornadoes and hurricanes. The ability to resist impact and tensile stresses within the panel is owed to both a steel mesh reinforcement encased within the panel's interior, as well as a surface coating of a high impact resistant material such as the aramid resin sold by E. I. Du Pont de Nemours and Company under the trademark KEVLAR. The exterior layer of the high strength material may be instead be placed as an interior layer within the concrete panel. It is expected, however, that use of the high strength material coating layer at the exterior surface of the panel permits the resistance of impact forces exerted upon a building thereby preventing destructive tensile stress from being introduced into the panel's body. In this manner, the compressive strengths of the concrete panel may be exploited, together with benefits realized from high strength, but more expensive building materials such as the aramid resin sold by E. I. Du Pont de Nemours and Company under the trademark KEVLAR. Through the combination of the several layers of different construction materials described herein, panels having significantly high strength may be manufactured for use in building construction that withstand test procedures required for use in storm prone localities.

Among others, the present invention includes the discovery of a lightweight concrete mixture that is achieved by add-mixing substantially closed body polystyrene pellets to a specially prepared concrete slurry. One aspect of the invention is the unique method utilized in the mixing process of the lightweight concrete. Another aspect is a unique application for the new mixture wherein modular panels are constructed for use in the erection of both commercial and residential buildings.

The primary benefit of the concrete composition itself is its lightweight nature. By incorporating the polystyrene particles, the weight of the resulting concrete is substantially reduced thereby making the composition utilizable in many more structural applications than previously possible. Not only is this concrete composition lightweight, but it also has other beneficial qualities such as flame retardation and insulative capacities as a construction material. It acts as an insulator because of the polystyrene pellets that are entrained throughout the mixture; each of which encapsulate air pockets that are inefficient conductors of heat and therefore good insulators.

This improved composition that produces lightweight concrete is utilizable in environments other than building construction. It is contemplated that such a lightweight concrete may be advantageously used in the casing of subterranean wells, such as water wells and oil wells. In the process of casing a well, the concrete is pumped downward adjacent to the well's piping and then normally it is pumped at least partially back-up about an opposite side of the tubular piping. The heavier the concrete, the more difficult it is to pump the fluidized mixture down along the casing; however, it is especially difficult to pump heavier mixtures back up along the conduit. It is also contemplated that the lightweight concrete of the present invention may be advantageously employed in any other environment wherein the resulting weight of the constructed element is a design criteria and the properties of this new composition otherwise satisfy the functional requirements of the end product.

It is contemplated that other types of lightweight aggregate may be used in place of the polystyrene or Styrofoam pellets. Fiberglass may be added to the mixture for providing additional strength to the resulting concrete while maintaining its lightweight nature. Still further, it is contemplated that organic matter having a low density such as cotton burrs may be employed as an aggregate for similar effects.

A particularly beneficial use of the lightweight concrete mixture has been discovered in the manufacture of lightweight construction panels used in the building of both exterior and interior walls of a building. As previously described, the lightweight concrete provides enhanced insulative capabilities that eliminate the need for additional insolation and other associated building materials in many instances. This composition is not only less expensive than other more conventional construction modes, but it also permits more rapid on-site erection of a building.

In a primary embodiment, these panels are constructed within a frame of C-shaped purlins that, when assembled, resemble a picture frame. The depth of these frames may be varied in order to alter the thickness of the resulting wall. Obviously, the thicker the wall, the heavier it will be, but it will also increase that wall's insulative capabilities and resistance to penetration. Therefore, by appropriately selecting the exterior framing of the panel, functional characteristics of the resulting wall may be varied and altered.

The framework of the panel provides ready means for attaching panels one to the other when forming a wall. In most instances, the C-purlin will be constructed from weldable steel making it possible to form a substantially contiguous wall out of adjacent panels. Other structural components may also be advantageously constructed from the lightweight concrete such as foundations wherein the underlying soil cannot support the extreme weight of a conventionally paved slab. Furthermore, it is especially useful in upper-floor slabs wherein weight is of the utmost importance and usually a design criteria.

Because of the panel's lightweight nature and relative high strength, this structural configuration is particularly advantageous for use as a safety shield in natural disasters such as hurricanes, tornadoes and earthquakes. Because of the present invention's reduced weight, a building constructed therefrom will be less susceptible to the effects of an earthquake because of the reduced mass in the upper floors. These panels may also be reinforced with either conventional rebar that is welded within the panel's frame or with a plastic reinforcing mesh that is connected within the frame and which increases the tensile strength of the panels. With appropriate reinforcement, these lightweight concrete panels can withstand almost all wind forces and can resist and provide adequate shields against the penetration of most flying debris.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

BRIEF DESCRIPTION OF THE DRAWINGS

FIG. 3 is a cross-sectional view of a portion of a panel illustrating a C-shaped frame segment with a fortifying reinforcement connected therein and with lightweight concrete solidified thereabout.

FIG. 4 is a partial cut-away showing at least portions of a building erected according to the present invention.

FIG. 5 is a cross-sectional view showing a framed lightweight concrete panel erected and anchored upon a building's foundation.

FIG. 6 is a cross-sectional view of a polystyrene pellet having a gas-filled cellular interior and exterior skin.

MODE(S) FOR CARRYING OUT THE INVENTION

Figure 1:
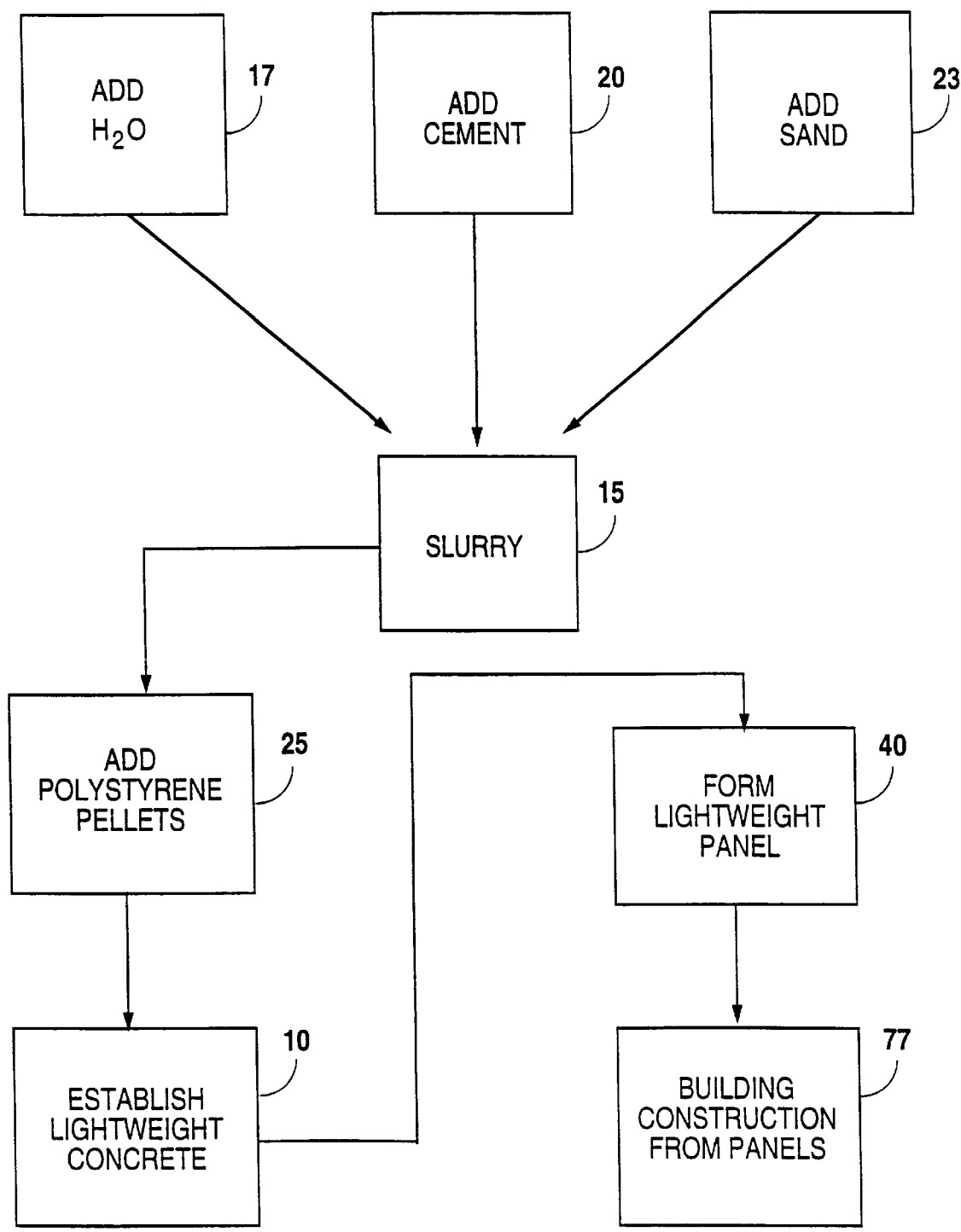
FIG. 1 is a flow diagram illustrating the process of mixing the lightweight concrete mixture, constructing the lightweight concrete panels from that mixture, and ultimately erecting buildings using the lightweight concrete panels as structural components.
Figure 2:
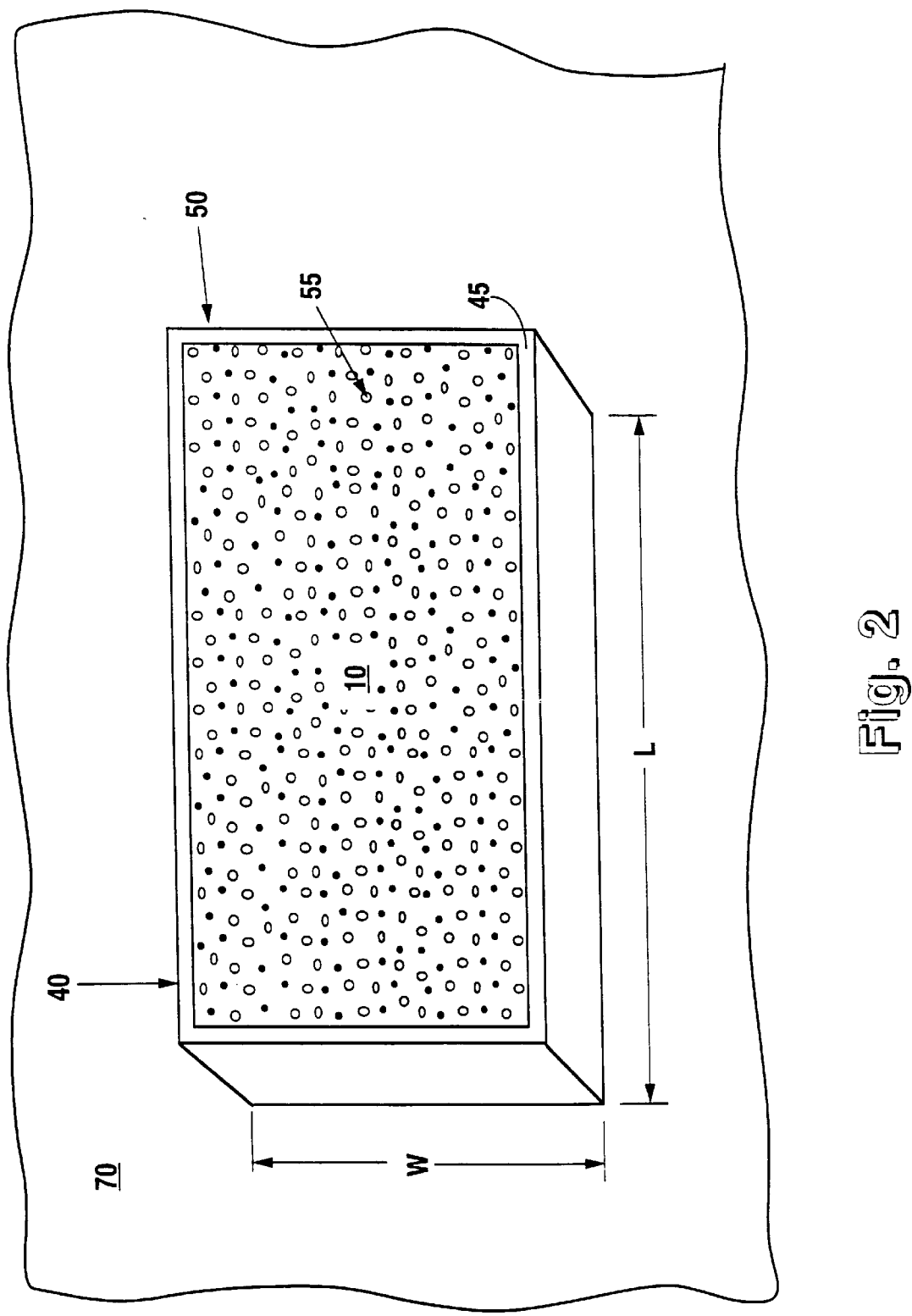
FIG. 2 is a perspective view of one of the manufactured lightweight concrete panels.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Certain terminology will be used in the following description for convenience and reference only and not for purposes of limitation. For example, the words "rightwardly", "leftwardly", "upwardly" and "downwardly" will refer to directions in the drawings to which reference is made. The words "inwardly" and "outwardly" refer to directions toward and away from, respectively, the geometric center of the structure being referred to. This terminology includes these words, specifically mentioned derivatives thereof, and words of similar import.

Furthermore, elements may be recited as being "coupled"; this terminology's use anticipates elements being connected together in such a way that there may be other components interstitially located between the specified elements, and that the elements may be connected in fixed or movable relation one to the other. Certain components may be described as being adjacent to one another. In these instances, it is expected that a relationship so described shall be interpreted to mean that the components are located proximate to one another, but not necessarily in contact with each other. Normally there will be an absence of other components positioned therebetween, but this is not a requirement. Still further, some structural relationships or orientations may be designated with the word "substantially". In those cases, it is meant that the relationship or orientation is as described, with allowances for variations that do not effect the cooperation of the so described component or components.

The present invention comprises a lightweight concrete mixture 10 that has been discovered to have unique characteristics and applications in its set or hardened state. Furthermore, several particularly advantageous applications have also been discovered that permit the employment of the lightweight concrete mixture 10 in ways that are specially beneficial to the building construction industry.

As previously described, it is known to mix shredded polystyrene into a soft cement mixture. To assure that the shredded polystyrene mixed into the cement, however, the cells of the polystyrene pieces previously were opened to allow the cement to infuse therein causing the polystyrene particles to have a density more similar to the cement mixture so that the two would mix. The present invention includes the discovery of a method by which polystyrene pellets 25 can be add-mixed to a slurry 15 that is made up of the same primary components that comprise most concrete mixtures. Those components that are typically mixed together to form a liquefied concrete slurry 15 are water 17, a cementing binder 20 and a fine grain aggregate 23. In most situations, the cementing binder 20 is portland cement and the fine grain aggregate 23 is typically sand. It has also been found advantageous to add a quantity of fly and/or bottom ash to the cement mixture. The fly ash is a common component of concrete mixes and is typically obtained as a waste product of coal burning processes. The fly ash has beneficial aspects because of its very fine particulate size. Because of this very small particulate size, the coal ash fills voids that would otherwise remain open thereby compromising the strength of the resulting set concrete structure. Fiber mesh may also be optionally added to the concrete mixture that consists of chopped, stranded fiberglass which is blended directly into the concrete prior to its utilization in a buildings construction. The fiberglass interweaves and provides tensile strength to the resulting structure and may be used to eliminate the use of wire or other rebar type reinforcement.

To achieve the advantageous qualities described herein, it has been discovered that the polystyrene pellets 25 must resist, instead of accommodate, the infusion of the other components of the slurry 15. Therefore, it is important that each polystyrene pellet 25 be a discrete unit that acts as a sealed air pocket or pouch. Such polystyrene pellets 25 have heretofore not been utilized in such a manner for producing a lightweight concrete mixture 10. Each polystyrene pellet 25 has a gas-filled cellular interior 30 that is encased within an exterior skin 35. The skin 35 is substantially impervious to fluid permeation. As such, the fluid components of the concrete slurry 15 are prevented from invading the cells of the polystyrene pellets' 25 interior 30. In this manner, the qualities enhanced by the gas-filled nature of the polystyrene pellets 25 are retained and prevented from being compromised as in the situation where those same cells would be purposefully opened by a shredding process that is used as a means by which the thorough mixing of polystyrene is achieved in a concrete mixture.

It has been discovered that polystyrene pellets 25 utilized in this invention are most advantageously sized to have diameters falling within a range between one-eighth of an inch and one-quarter of an inch. Such sized pellets 25 are readily achieved by pulling polystyrene early from the puffing process before complete expansion is achieved. By using these pre-puff polystyrene pellets 25 having sizes in the prescribed range, fastenability is provided. Specifically, with the size of voids established by the pellet' presence, typical wood screws and nails can pierce into the hardened lightweight concrete structures and be restrained therein and prevented from unintentionally pulling out. This is achieved because the voids are easily pierced by the nails and screws which are restrained by the engaged concrete portions that surround and establish the side surfaces of such voids.

Because of the pellets' 25 relative lightweight in comparison to the concrete slurry 15, it has been discovered that mechanical characteristics must be imparted to the slurry 15 to assure that, when the polystyrene pellets 25 are add-mixed thereto, they blend homogeneously throughout the slurry 15 to create the desired lightweight concrete mixture 10. In order to achieve such a homogenous mixing, it has been found of primary importance to raise the viscosity of the slurry 15 so that when the polystyrene pellets 25 are added they are held within the slurry 15 and not permitted to segregate therefrom by a floating action. In practice, this increased viscosity is achieved by carefully monitoring the proportions of the components that make up the slurry 15. Specifically, the amount of water normally added to establish a typical concrete mixture is reduced. By such a reduction, the mixture is dryer and therefor more viscous and resistant to flow. This feature accounts for the resistance of the mixture 10 to the floating of the polystyrene pellets 25 therefrom. While the exact proportions of the components to be so mixed together into the lightweight concrete mixture 10 are not absolutely critical, it has been found to be advantageous for the volumetric proportions of the components of the mixture 10 to be approximately one part portland cement 20, approximately two parts sand 23, and approximately five parts polystyrene pellets 25.

Prior to the introduction of the polystyrene pellets 25, the consistency of the concrete slurry 15 is adjusted by controlling the amount of water added thereto. In order to achieve the desired effects described herein, that amount of water is minimized thereby raising the viscosity of the slurry 15 and even establishing a tacky quality that causes the slurry 15 to adhere to the dry polystyrene pellets 25 when added thereto. By continued mixing of the lightweight concrete mixture 10, the polystyrene pellets 25 are retained homogeneously therein despite a wide disparity between those pellets' 25 relatively low density and the substantially greater density of the slurry 15 to which those pellets' 25 have been added.

A particularly advantageous application for the employment of such a lightweight concrete mixture 10 as has been described immediately above is the manufacture of lightweight concrete panels 40 that can be used as pre-formed structural components in the building industry. Such lightweight concrete panels 40 have many beneficial characteristics resulting because the lightweight mixture 10 is used in their manufacture. Among those benefits are increased insulative characteristics, as well as a reduction in the weight of such a constructed panel 40 in comparison to a similarly configured and dimensioned panel made from a conventional concrete mixture. These concrete panels 40 are constructed so that they may be utilized as a previously fabricated (commonly abbreviated as "pre-fab") component that may be manufactured at one location and transported to a building site. This remote manufacture is a highly desirable capability because the environment within which the panels 40 are constructed is more easily controlled within a factory setting than at an actual building site. Furthermore, by constructing the panels 40 in a factory, the building materials may be centrally located as can the mixing machinery.

In the manufacturing process of a concrete panel 40 according to the present invention, a concrete frame 50 is initially constructed. In a preferred embodiment, the concrete frame 50 resembles a picture frame in that it is rectangularly shaped with a concrete body of the panel 40 contained within that frame 50. Such a frame 50 is preferably constructed from frame segments 45 that are cut from C-shaped purlins 65. While it is not absolutely necessary that the segments 45 be joined at right angles at the corners, it is preferred so that a welded seam may be had at such a corner for structural integrity of the frame 50. The C-shaped purlin 65 is configured so that an interior space is established within the segment itself. Each segment is oriented so that an open side of the purlin 65 opens toward an interior space 55 of the frame 50. The interior space 55 establishes and forms a receiver within which the lightweight concrete mixture 10 is deposited and retained. In a preferred embodiment, fortifying reinforcements 60 are coupled within the frame 50 for adding structural strength to the panel 40 after the concrete mixture 10 has set. It is contemplated that the reinforcements 60 may take the form of conventional metal rebar that is welded into the interior space 55 of the frame 50, or alternatively it may comprise a plastic mesh 60 which is also commonly used in concrete construction for providing reinforcement against tensile stresses experienced by the panel 40. These reinforcements 60 are required because the concrete itself is primarily capable of supporting compression forces while the reinforcement 60 resists tensile stresses that may otherwise compromise the integrity of the panel 40. It is common for such mesh to be manufactured from plastic or other material different than metal and therefore it may be required that such reinforcement be connected to the frame 50 in ways other than welding such as adhesives or mechanical couplings.

It is highly desired that the lightweight concrete panels 40 constructed according to the present invention be readily accepted by the construction industry and easily integrated into current building designs. It has been discovered that such panels 40 may be advantageously dimensioned to four foot widths by eight foot heights. In this manner, the panels 40 are similarly sized to conventional plywood sheeting and gypsum dry wall or sheetrock that are readily available and commonly used by building designers and construction workers who are familiar and comfortable with such dimensions. Like other manufactured components, panels 40 of variable sizes may be easily constructed merely by varying the dimensions of the concrete frame 50 within which the panel 40 is constructed.

Each frame 50 is constructed so that the frame segments 45 that establish the perimeter of the panel 40 are substantially maintained within a single plane. That is to say, when the frame 50 is laid upon a flat surface, it lays in substantially continuous contact therewith. This is important in that the panels 40 are constructed by positioning such a planar frame 50 on plastic sheeting 70 laying upon a flat surface so that the interior space 55 may be filled with the lightweight concrete mixture 10. The sheeting 70 may be constructed from other material than plastic that is stick-resistant with respect to the lightweight concrete mixture 10. What is important is that after the panel has solidified and the concrete hardened that it be easily removed from that sheeting 70 without undue adhesion.

Alternatively, a different type of sheeting 70 may be used that does adhere to the concrete mixture 10 and as a result forms an encasement at one side of the panel 40. Such a configuration finds application where it is advantageous that the panel 40 be water-tight or otherwise resistant to moisture passing therethrough. Instances of such application might be exterior walls of buildings that are to be weather-tight. In this case, what the sheet 70 upon which the panel 40 is constructed must do is assure that the panel 40 may be easily raised from the flat surface upon which the panel 40 was originally poured, but may remain attached to the surface of the panel 40.

The panel 40 itself is constructed by placing the frame 50 upon the sheeting 70 which covers a flat surface. The appropriately mixed lightweight concrete mixture 10 is then poured into the frame 50 so that it is completely filled. The mixture 10 in frame 50 may be appropriately agitated to assure that large air pockets and voids have been eliminated from the high viscosity concrete mixture 10. Excessive agitation, however, should be prevented because of the floating tendencies of the polystyrene pellets 25 within the lightweight concrete mixture 10, despite the mixture's 10 relatively high viscosity. The top surface of the panel 40 opposite the lower surface is smoothed so that the top and bottom surfaces are established parallel one to the other.

After the panel 40 has been accordingly formed, the concrete mixture 10 is permitted to solidify and harden into a rigid panel 40 that may be utilized as a building construction component. Because the curing and setting process of the panel 40 preferably takes place within a factory setting, the conditions for curing may be controlled and optimized. Such conditions include hydration which is the continuous application of water that is required in the curing process.

The characteristics of the panel 40 may be varied by selecting differently sized C-shaped purlins 65 for the construction of the frame 50. The depth of such purlins 65 vary widely and are contemplated to optimally range between three and ten inches. The depth measurements may vary widely, however, based on the in-use criteria for the panel 40.

The panels 40 are commonly employed in an up-ended configuration to form both interior and exterior walls 90 of a building 77. Because of the unique combination of the several constituent components that make up the lightweight concrete mixture 10 and ultimately the lightweight concrete panel 40, particularly advantageous qualities are achieved within the panel 40 with respect to such building's 77 construction. Because of the high polystyrene pellet 25 composition, the qualities of the panel 40 are substantially altered from a panel constructed from conventional concrete mixtures. It has been found that panels 40 constructed according to the present invention may be manipulated similarly to panels constructed from sheetrock and wood. More specifically, these lightweight concrete panels 40 may be sawed by conventional means, as well as nailed and screwed. These features provide substantial improvements over conventionally constructed concrete panels and facilitate their customability at the building site by the personnel commonly employed for their erection.

Because of the wide array of environments within which such panels 40 may be utilized, it may be more advantageous to have the C-shaped purlins 65 constructed from a material such as plastic, rather than metal, that may also be easily cut like the concrete body of the panel 40. Such a plastic composition of the C-shaped framing purlin 65 is considered optional because in many construction applications a metal frame 50 will be more desirable because it facilitates a weld connection between such panels 40 in the formation of a wall 90.

Because the end use of the panels 40 will oftentimes be known, each panel may be specifically constructed for that particular application. Therefore each panel 40 may be custom formed and include optional features that may be advantageously utilized in the building's 77 construction. One such feature that has been identified as a commonly desired option is the provision of an elongate recess 75 along a portion of the panel 40 that will be horizontally located at a distance above the flooring of a building 77. This recess 75 is configured and sized so that it accepts different conduits that may be desired to be run within an upright wall 90 of the building 77. In this configuration, when the panel 40 is installed into a building 77, the elongate recess 75 will be substantially parallely oriented to a bottom edge or base 95 of the wall 90 at a distance of approximately fourteen inches from that edge 95.

Another embodiment of the present invention is the utilization of the above described lightweight concrete panel 40 in the construction of a building 77 as described herein. In this embodiment of the invention, the several lightweight concrete panels 40 required for the building's 77 construction are made at a manufacturing facility that is oftentimes remotely located from the actual building site. At the site, a building foundation 80 serves as the base upon which the balance of the building is constructed. In that construction, the several concrete panels 40 are erected upon the foundation 80 in an upright or up-ended orientation. Prior to such erection, the foundation 80 is framed and poured so that the resulting configuration is ready for acceptance of the several panels 40 to be erected thereon. To facilitate the installation of such panels 40, a recess 85 is established about a perimeter of the foundation 80 for receiving the base or lower end 95 of an upright panel 40 forming an exterior wall 90 of the building 77. In a preferred embodiment, the recess 85 is established by placing a three by four inch or similarly configured metal angle 97 at the top exterior edges of the foundation 80. Such angles are oriented so that they open outwardly away from the interior portions of the foundation 80 and provide a seat 97 for the base 95 of the up-righted panels 40.

The depth at which such angles 97 are recessed into the foundation 80 is such that in a preferred embodiment, the exterior surface of the upright panel 40 is aligned and substantially planar to the exterior surface of the foundation 80 located and extending below the upright wall 90. In this manner, a substantially continuous side wall of the building 77 is established and may be appropriately treated for weather resistance and other desirable qualities. In this configuration, the elongate recess 75 that had been created within the panel 40 during its manufacture is directed inwardly so that any conduits located therein will be protected from environmental elements and retained substantially within the body of the panel 40 itself. As previously described, the thickness of such walls may be varied according to specifications by changing the thickness of the panels 40 utilized in the construction.

It is also contemplated that the lightweight concrete panel 40 may be utilized as interior upright walls 90 that may be directly positioned and located upon an upper surface of the building foundation 80 or may be optionally recessed into the top surface of the foundation 80. It is contemplated that such a recess may be established by the location of an appropriately sized C-shaped purlin 65 located within the body of the foundation with its opening even with the upper foundation surface.

The angle iron 97 with which the recess 85 is established within the foundation 80 is contemplated to be advantageously constructed from materials that may be compatibly connected directly to the frame 50 located about the perimeter of the panels 40. That is to say, it is preferred that the frame segments 45 be constructed from a compatible metal to the angle iron 97 so that the bases 95 of the upright walls 90 may be welded within the recess 85. Alternatively, adhesives of various types may be similarly utilized, but welding is appreciated for its strength and integrity in the building industry. Accordingly, such panels 40 are erected upon the foundation 80 thereby establishing upright walls 90; adjacent panels 40 may be connected one to the other to provide a fortifying strength to the building 77 itself. As with the construction and connection between the base of the panel 95 and the recess 85, it is preferred that the attachment of adjacent panels be by welding between appropriately constructed panel frames 50.

Because of each panel's 40 ability to support and withstand substantial compression forces applied thereto, such walls 90 may be used as weight bearing construction components in contrast to conventionally constructed non-load bearing walls comprising such materials as sheetrock and plywood. Walls constructed according to the present invention from lightweight concrete panels 40 may have roofing structures supported thereon, or even upper-floor slabs.

In keeping with the utilization of the herein described lightweight concrete mixture 10, it is contemplated that the upper floors described immediately above may also be formed from the lightweight concrete mixture 10. This concrete construction may be employed where not otherwise feasible because of the substantial reduction in weight made possible by the polystyrene pellets 25 entrained within the mixture 10. Furthermore, the use of the lightweight concrete mixture 10 adds fire retardation qualities, as well as temperature insolation and sound deadening capabilities.

Ultimately, because of the enhanced features of appropriately constructed panels 40 that enable the panels 40 to be sawed, nailed, and otherwise manipulated, it is possible to finish the construction of the building 77, both interiorly and exteriorly with conventional and desired materials. Still further, it is contemplated that buildings 77 may be constructed from continuous panels 40 that are then provided with apertures for accommodating such structural features as doors, windows and other passages. Alternatively, the panels may be formed having such apertures already constructed therein. The ability to establish such features on-site, however, is highly desirable and eliminates the inclusion of pre-erection and design requirements at the manufacturing facility. In this way, uniform panels may be utilized that are less expensively and more time efficiently constructed and handled throughout the manufacturing process, as well as during erection at the building site. After a building 77 has been constructed as described, a roofing system may be applied directly thereto and supported upon such wall structures.

Figure 8:
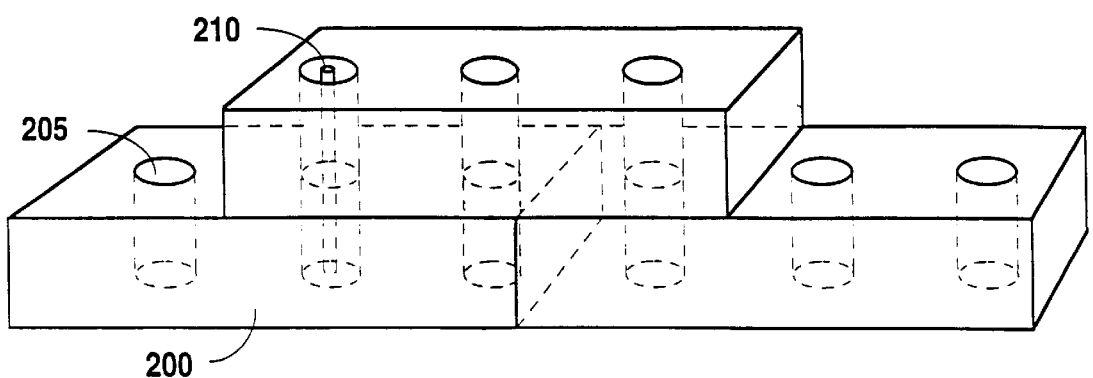
FIG. 8 is perspective view of three building block units arranged so that the hollowed columns are vertically aligned with a rebar insert located within one of such columns.

An additional embodiment of the present invention illustrated in FIG. 8 contemplates the utilization of the lightweight concrete mixture 10 in the manufacture of large sized building block units 200 that may be used as substitutes for conventionally known cinder blocks in the construction of buildings 77. Because of the substantially reduced weight of these newly configured blocks 200, they may be substantially larger than known cinder blocks. Their configuration, however, is similar in that alignable voids or hollowed columns 205 are included so that when several blocks are stacked and staggered one row upon the other they may be tied together through these aligned columns 205 by such means as rebar 210. Later a load bearing columns are constructed by the filing of such aligned voids with either lightweight concrete 10 or conventional concrete mixtures. Like the panels 40, it is contemplated that blocks 200 accordingly constructed may be remotely manufactured from the building site. Because these blocks have such a reduced overall weight, installation personnel may individually lift into position each block 200, even when having lengths exceeding three feet. In other respects, the walls resulting from such blocked construction may be finished similar to those constructed from the lightweight concrete panels 40.

The building block units 200 may be glued together between increasingly rising layers as opposed to using conventional mortar known from cinder block construction. By eliminating the use of mortar between layers, there is no longer a concern about a squeeze effect that displaces mortar between lower layers of blocks as a result of the increasing layers of blocks stacked thereupon. In a preferred embodiment, the first row of blocks 200 may be glued directly to a supporting foundation with increasing rows glued thereupon as they are stacked one above the other. In conventional construction using cinder blocks, only a prescribed number of rows of blocks could be installed at one time. This limitation has been eliminated by substituting the glue for mortar which permits an entire wall to be continuously stacked without concern for the increased weight caused by the building block units 200.

An enhanced version of the concrete panel 40 whose construction is described herein above has been discovered wherein a composite laminate 100 is applied to at least one exterior surface of a panel 140. The composite laminate 100 is formed into a layer substantially covering at least one side surface of the panel 140. This laminate 100 is constructed from a resin based material in at least one embodiment. In this embodiment, multiple layers establishing the composite are installed one upon the others. Initially, a first layer of a catalyzed resin 105 is brush painted, sprayed or otherwise applied in a layer upon one of the side surfaces of a panel 140. To that first layer, a layer of fiberglass cloth or mat 110 is applied that continuously covers the side surface of the panel 140. In a preferred embodiment, this fiberglass cloth 110 is seven ounce mesh. This two layer composite 100 can then be repeated multiple times thereby forming a laminate of variable thickness and strength.

One particular environment wherein this composite laminate has been utilized is for repelling flying missiles. Such missiles are often encountered in storm situations such as tornadoes and hurricanes. In these cases, building code provisions will often call for a specific repelling capability that may be measured in a wall's ability to stop a missile of a specified weight and traveling at a certain speed from penetrating the wall. One specific example and test is outlined herein below regarding such a composite laminate 100 upon the side surface of a panel 140.

It is also contemplated that this composite laminate 100 can be added to the building block construction described herein above. Still further, such a laminate can be added directly to roofing materials that have holes or voids extending therethrough to affect an impact resistant sealer by providing a continuous waterproof coating thereto.

Figure 7:
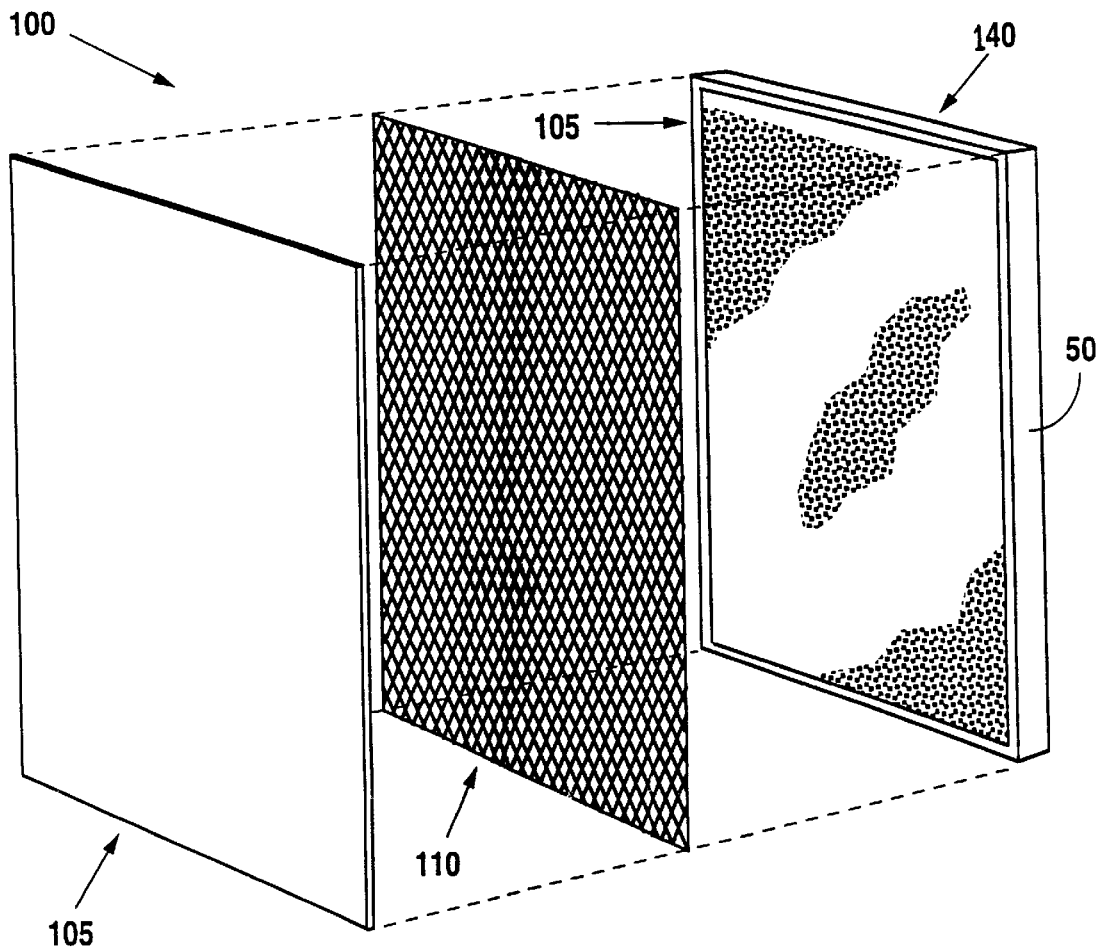
FIG. 7 is a schematic view of a laminate building construction panel including a high strength exterior layer joined to a concrete panel that are together suitable for use in building construction.

Another example of suitable mesh 110 is the high strength material known by the trade name the aramid resin sold by E. I. Du Pont de Nemours and Company under the trademark KEVLAR. As illustrated in FIG. 7, a typical concrete panel 140 may be constructed within the frame 150 about the panel's 140 perimeter. Within the body of the panel is located an expanded steel sheet which in the preferred embodiment is shown as a webbed sheet 160. This sheeting 160 is fixed within the frame 150 about the sheets 160 periphery. Either lightweight concrete 10 is then poured about the expanded steel sheeting 160, or if end use requirements dictate, standard and/or high density concrete may be used for the encasement about the steel sheeting 160 thereby establishing the body of the panel 140. The composite laminate 100 is then added as either a coating or adhered layer to at least one of the side surfaces of the panel 140. Alternatively, it is contemplated that the composite layer 100 may be placed within the interior of the panel 140, but it is most advantageously placed at the exterior surface.

By the layered panel construction described immediately above, it has been discovered that the resulting concrete panel 140 has especially high capacities for resisting side loads upon the panel 140, and especially impact loads resulting from objects striking thereupon. An example would be airborne objects carried by the high winds of a tornado or hurricane. As will be demonstrated below, these types of striking forces can be recreated in test facilities and controlled to determine the capabilities of panels 140 so constructed.

Through the inclusion of the laminate layer, it has been discovered that great impact forces can be resisted and the integrity of the concrete panel 140 preserved. Not only does the high strength laminate layer 100 resist breakage upon impact from a striking object, but it also serves to spread and distribute the force over the surface of the panel 140 so that high stresses or point stresses are not experienced in the body of the panel 140. It has also been discovered that such a laminate layer can serve as the waterproofing that imparts the advantageous characteristics for the panel 40 described hereinabove with respect to water-shed characteristics in subterranean settings.

The combination of the concrete panel 140 together with the laminate layer 100 has withstood striking forces with surprising results. At least one panel constructed as illustrated in FIG. 7 and described herein above has been tested with successful results under storm conditions. These conditions and the results of that test are described herein below.

TEST RESULT

A missile impact test was performed on a prefabricated lightweight concrete panel 140 constructed as described herein above, including the resistive laminate layer. The panel 140 had a height and width of four feet and a thickness of four inches. A four inch steel channel section 165 extended around the perimeter of the test panel 140. The face of the panel 140 was coated with a composite laminate 100 similar to the aramid resin sold by E. I. Du Pont de Nemours and Company under the trademark KEVLAR. The objective of this test was to qualify the test panel 140 for tornado missile impact criteria. One missile impact test was performed on the panel 140. The panel 140 was tested on Apr. 21, 1997. The designated missile did not perforate. The panel 140 was successful in resisting the prescribed missile impact.

The missile impact test facility in the Civil Engineering Department at Texas Tech University, Lubbock, Tex., was used to conduct the tests. The tornado missile cannon was used to propel the missile. The cannon is air actuated and capable of propelling two inch by four inch timber missiles at speeds in excess of 150 miles per hour. A calibrated electronic timing device measures the speed of the missile just prior to impact. A reaction frame supported the test panel 140; a backstop controls the missile if it perforates the test panel 140.

The panel was tested against tornado missile criteria of the Federal Emergency Management Agency (FEMA), TRS-83A, *Interim Guidelines for Building Occupant Protection from Tornadoes and Extreme Winds* (1980). The criteria calls for a two inch by four inch timber missile weighing fifteen pounds and striking on end with an impact speed of 100 mph. The actual missile used was a two inch by four inch timber weighing fourteen and seven tenths of a pound and having a length of twelve feet. The test panel 140 was clamped to the reaction frame with C-clamps. A plastic sabot was attached to the trailing end of the missile prior to inserting the missile into the cannon barrel. The operational air pressure was set at 43.0 psi to obtain a missile speed of 102 mph to compensate for the 0.3 lb. under weight.

The test panel 140 was impacted with the two inch by four inch timber missile at an impact speed of 124.1 miles per hour. The impact point was near the center of the panel 140. The missile perforated the composite coating on the front face, but did not penetrate or perforate the panel 140. In fact, the missile broke up into splinters.

A lightweight concrete composition and several of its special applications have been described herein. An exemplary application is the combination of a concrete building construction panel with a composite laminate coating or composite layer that fortifies and sufficiently strengthens the combined panel to a degree that a panel so constructed can be used for construction purposes in high strength storm areas. These and other variations which will be appreciated by those skilled in the art are within the intended scope of this invention as claimed below. As previously stated, detailed embodiments of the present invention are disclosed herein; however, it is to be understood that the disclosed embodiments are merely exemplary of the invention that may be embodied in various forms.

INDUSTRIAL APPLICABILITY

The present invention finds industrial applicability in its utilization in building component units. More specifically, the lightweight concrete mixture may be utilized in the manufacture of concrete panels to be used as interior and exterior walls and flooring and roofing panels. The lightweight concrete may also be used in the construction of building blocks used as substitute for conventional cinder block construction. Further, the concrete panels may be coated by a composite laminate for the prevention of the penetration or perforation of the panel by a missle such as occurs during a tornado.

What is claimed is:

1. A method of manufacturing a projectile resistant concrete panel used in the construction of buildings and configured to resist damage caused by side impacts from wind-blown objects during severe storm conditions, said method comprising the steps of:

establishing a concrete panel for use in the construction of a building;

applying a composite laminate to at least one exterior surface of said panel for establishing a projectile resistant panel; and configuring said Projectile resistant panel to retard piercings by a wind-blown object wherein said wind-blown object is a two inch by four inch timber missile weighing fifteen pounds and striking on end with an impact speed of at least one hundred miles per hour.

2. The method of manufacturing a concrete panel as recited in claim 1 wherein said laminate establishes a sufficient thickness upon said layer to create a panel capable of resisting penetration by a missle.

3. The method of manufacturing a concrete panel as recited in claim 1 wherein the method of making said panel is further comprised of the steps of:

coupling a plurality of frame segments so that a concrete frame is established, said frame having an interior space for receiving a concrete mixture;

filling said frame with said concrete mixture so that said interior space is spanned by said concrete mixture across said frame thereby creating a panel; and curing said concrete mixture to a rigid state so that said concrete mixture is retained within said frame thereby forming a lightweight concrete panel.

4. The method of manufacturing a concrete panel as recited in claim 3 wherein said concrete mixture is a lightweight concrete mixture.

5. The method of manufacturing concrete panels as recited in claim 4 further comprising:

preparing said lightweight concrete mixture by mixing a slurry having water, a cementing binder and a fine grain aggregate and add-mixing polystyrene pellets to said slurry thereby forming a substantially homogeneous lightweight concrete mixture, said polystyrene pellets comprising a gas-filled cellular interior encased within an exterior skin, said exterior skin being substantially impervious to said slurry.

6. The method of manufacturing concrete panels as recited in claim 1 wherein said composite laminate is comprised of a catalyzed resin.

7. The method of manufacturing concrete panels as recited in claim 6 wherein said composite laminate is further comprised of a mat.

8. The method of manufacturing concrete panels as recited in claim 7 further comprising:

constructing said composite laminate by applying at least one layer of said resin upon at least one side surface of said panel substantially covering said side surface of said panel;

applying said mat to said resin wherein said mat continuously covers said side surface of said panel; and increasing the thickness and strength of said laminate by repeating the process of applying layers of said resin and said mat to said panel.

9. The method of manufacturing concrete panels as recited in claim 8 wherein said thickness and strength of said laminate is such that said concrete panel is able to resist impact of of a missle having a speed upon impact of at least one hundred miles per hour, said missle having dimensions of two inches by four inches by twelve feet and weighing fourteen and seven tenths of a pound.

10. The method of manufacturing a projectile resistant concrete panel used in the construction of buildings and configured to resist damage caused by side impacts from wind-blown objects during severe storm conditions as recited in claim 1, further comprising:

testing the storm worthiness of said projectile resistant concrete panel by projecting a two inch by four inch timber missile weighing fifteen pounds toward said projectile resistant concrete panel; and striking said projectile resistant concrete panel with said timber missile on end with an impact speed of at least one hundred miles per hour.

11. The method of manufacturing a projectile resistant concrete panel used in the construction of buildings and configured to resist damage caused by side impacts from wind-blown objects during severe storm conditions as recited in claim 10, wherein said impact speed exceeds one hundred and twenty miles per hour and penetration of said projectile resistant concrete panel is retarded.

12. The method of manufacturing a projectile resistant concrete panel used in the construction of buildings and configured to resist damage caused by side impacts from wind-blown objects during severe storm conditions as recited in claim 10, further comprising:

directing said timber missile toward a center of said projectile resistant concrete panel; and impacting said projectile resistant concrete panel at a substantial geometric center thereof.

13. A projectile resistant concrete panel for use in the construction of buildings comprised of:

a projectile resistant concrete panel;

a composite laminate that covers at least a portion of one side surface of said panel thereby establishing a projectile resistant panel; and said projectile resistant panel adapted to retard piercings by a wind-blown object wherein said wind-blown object is a two inch by four inch timber missile weighing fifteen pounds and striking on end with an impact speed of at least one hundred miles per hour.

14. The concrete panel as claimed in claim 13 wherein said concrete panel is constructed by coupling a plurality of frame segments so that a concrete frame is established, said frame having an interior space for receiving a concrete mixture, filling said frame with said mixture so that said interior space is spanned by said concrete mixture across said frame, and curing said concrete mixture to a rigid state so that said concrete mixture is retained within said frame thereby forming a concrete panel.

15. The concrete panel as claimed in claim 13 wherein said concrete mixture is a lightweight concrete mixture.

16. The concrete panel as claimed in claim 15 wherein said lightweight concrete mixture is further comprised of:

a slurry having water, a cementing binder and a fine grain aggregate; and a plurality of polystyrene pellets, wherein said pellets are add-mixed to said slurry thereby forming a substantially homogeneous lightweight concrete mixture, said polystyrene pellets comprising a gas-filled cellular interior encased within an exterior skin, said exterior skin being substantially impervious to said slurry.

17. The concrete panel as claimed in claim 13 wherein said laminate is further comprised of at least one layer of a catalyzed resin applied to said side surface of said panel.

18. The concrete panel as claimed in claim 17 wherein said laminate is further comprised of at least one layer of a mat applied to said resin.

19. The concrete panel as claimed in claim 18 wherein said laminate is of sufficient thickness and strength to create a panel capable of resisting penetration by a missle.

* * * * *